US006785739B1

(12) United States Patent
Tutt et al.

(10) Patent No.: US 6,785,739 B1
(45) Date of Patent: Aug. 31, 2004

(54) DATA STORAGE AND RETRIEVAL PLAYBACK APPARATUS FOR A STILL IMAGE RECEIVER

(75) Inventors: Lee W. Tutt, Webster, NY (US); Robert W. Spurr, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/511,513

(22) Filed: Feb. 23, 2000

(51) Int. Cl.[7] .............................................. G06F 15/16
(52) U.S. Cl. ..................................... 709/245; 345/328
(58) Field of Search .......................... 709/21–204, 206, 709/217, 219, 231, 226, 247, 245, 232; 358/500; 359/143; 345/98, 328; 348/222; 340/870.17; 386/69

(56) References Cited

U.S. PATENT DOCUMENTS

| 3,580,565 A | 5/1971 | Mallory et al. |
| 3,713,148 A | 1/1973 | Cardullo et al. |
| 3,835,301 A | 9/1974 | Barney |

(List continued on next page.)

FOREIGN PATENT DOCUMENTS

| EP | 0 727 696 A | 8/1996 |
| JP | 02-164872 | 6/1990 |
| JP | 06044265 | 7/1992 |
| NL | A 9400392 | 3/1994 |
| WO | WO 98/52762 | 11/1998 |

OTHER PUBLICATIONS

Digital Consumer Formats., 1997, viswiz.gmd.de/MultimedialInfo/dcf.html.*
Using Satellite for Worldwide Tele–health and Education—The Gates Proposal, esapub.esrin.esa.it/bulletin/bullet81/edin81.htm.*

(List continued on next page.)

Primary Examiner—Marc D. Thompson
Assistant Examiner—Thong Vu
(74) Attorney, Agent, or Firm—Norman Ruschefsky (57) ABSTRACT

Apparatus (10) for storage and retrieval of audio, sound or other data in association with a fixed still image including an image receiver (28) including a medium for fixing a reproduction of the still image thereon, and a transponder (36) connected to the image receiver (28) including an antenna (42) for receiving and sending signals, a memory (48) for storing address information for accessing a site (76) on a communications network (72) containing the data relating to the still image, a processor (52) and circuitry connected to the memory (48) and the antenna (42) for retrieving the address information and outputting an output signal (64) including the address information over the antenna (42) when a read signal (60) is received. The apparatus (10) can additionally include a transceiver (56) including an antenna (58) for outputting the read signal (60) to the transponder (36) and receiving the output signal (64) from the transponder (36).

27 Claims, 3 Drawing Sheets

U.S. PATENT DOCUMENTS

| | | |
|---|---|---|
| 4,075,018 A | 2/1978 | Custer |
| 4,129,855 A | 12/1978 | Rodrian |
| 4,178,183 A | 12/1979 | Ciurca, Jr. et al. |
| 4,208,210 A | 6/1980 | Sakai et al. |
| 4,247,758 A | 1/1981 | Rodrian |
| 4,270,853 A | 6/1981 | Hatada et al. |
| 4,270,854 A | 6/1981 | Stemme et al. |
| 4,275,103 A | 6/1981 | Tsubusaki et al. |
| 4,394,441 A | 7/1983 | Kawaguchi et al. |
| 4,416,963 A | 11/1983 | Takimoto et al. |
| 4,418,141 A | 11/1983 | Kawaguchi et al. |
| 4,431,764 A | 2/1984 | Yoshizumi |
| 4,495,276 A | 1/1985 | Takimoto et al. |
| 4,571,361 A | 2/1986 | Kawaguchi et al. |
| 4,600,280 A | 7/1986 | Clark |
| 4,663,625 A | 5/1987 | Yewen |
| 4,742,470 A | 5/1988 | Juengel |
| 4,772,962 A * | 9/1988 | Tanaka et al. ............... 386/69 |
| 4,806,958 A | 2/1989 | Momot et al. |
| 4,855,769 A | 8/1989 | Slavitter et al. |
| 4,880,325 A | 11/1989 | Ueda et al. |
| 4,905,029 A | 2/1990 | Kelley |
| 4,983,996 A | 1/1991 | Kinoshita |
| 4,990,092 A | 2/1991 | Cummings |
| 4,999,276 A | 3/1991 | Kuwabaa et al. |
| 5,008,661 A | 4/1991 | Raj |
| 5,019,815 A | 5/1991 | Lemelson et al. |
| 5,030,544 A | 7/1991 | Olbrechts et al. |
| 5,049,898 A | 9/1991 | Arthur et al. |
| 5,049,904 A | 9/1991 | Nakamura et al. |
| 5,059,126 A | 10/1991 | Kimball |
| 5,078,523 A | 1/1992 | McGourty et al. |
| 5,104,247 A | 4/1992 | Ohshima |
| 5,105,190 A | 4/1992 | Kip et al. |
| 5,122,445 A | 6/1992 | Ishigaki |
| 5,184,152 A | 2/1993 | French |
| 5,185,315 A | 2/1993 | Sparer |
| 5,196,846 A | 3/1993 | Brockelsby et al. |
| 5,196,862 A | 3/1993 | Fisher, Sr. |
| 5,224,784 A | 7/1993 | Haftmann et al. |
| 5,266,968 A | 11/1993 | Stephenson |
| 5,266,975 A | 11/1993 | Mochizuki et al. |
| 5,268,708 A | 12/1993 | Harshbarger et al. |
| 5,290,190 A | 3/1994 | McClanahan |
| 5,294,525 A | 3/1994 | Yamauchi et al. |
| 5,297,881 A | 3/1994 | Ishiyama |
| 5,300,575 A | 4/1994 | Jonas et al. |
| 5,305,020 A | 4/1994 | Gibbons et al. |
| 5,307,160 A * | 4/1994 | Enari ..................... 358/500 |
| 5,309,564 A * | 5/1994 | Bradley et al. ............ 359/143 |
| 5,310,999 A | 5/1994 | Claus et al. |
| 5,312,681 A | 5/1994 | Muys et al. |
| 5,313,235 A | 5/1994 | Inoue et al. |
| 5,318,370 A | 6/1994 | Nehowig |
| 5,323,704 A | 6/1994 | Fraczek |
| 5,331,338 A | 7/1994 | Mager |
| 5,340,676 A | 8/1994 | Anderson et al. |
| 5,342,671 A | 8/1994 | Stephenson |
| 5,347,274 A | 9/1994 | Hassett |
| 5,354,613 A | 10/1994 | Quintens et al. |
| 5,365,312 A | 11/1994 | Hillman et al. |
| 5,368,995 A | 11/1994 | Christian et al. |
| 5,372,924 A | 12/1994 | Quintens et al. |
| 5,382,494 A | 1/1995 | Kudo et al. |
| 5,385,416 A | 1/1995 | Maekawa et al. |
| 5,391,472 A | 2/1995 | Muys et al. |
| 5,398,257 A | 3/1995 | Groenteman |
| 5,403,467 A | 4/1995 | Jones et al. |
| 5,426,011 A | 6/1995 | Stephenson |
| 5,430,441 A | 7/1995 | Bickley et al. |
| 5,443,944 A | 8/1995 | Krafft et al. |
| 5,455,617 A | 10/1995 | Stephenson et al. |
| 5,459,021 A | 10/1995 | Ito et al. |
| 5,466,576 A | 11/1995 | Schulz et al. |
| 5,484,694 A | 1/1996 | Lelental et al. |
| 5,491,327 A | 2/1996 | Saroya |
| 5,491,468 A | 2/1996 | Everett et al. |
| 5,493,385 A | 2/1996 | Ng |
| 5,504,507 A | 4/1996 | Watrobski et al. |
| 5,513,920 A | 5/1996 | Whritenor et al. |
| 5,516,590 A | 5/1996 | Olmstead et al. |
| 5,521,663 A | 5/1996 | Norris, III |
| 5,528,222 A | 6/1996 | Moskowitz et al. |
| 5,528,377 A | 6/1996 | Hutcheson |
| 5,530,702 A | 6/1996 | Palmer et al. |
| 5,532,727 A | 7/1996 | Agano et al. |
| 5,537,920 A | 7/1996 | Hasegawa et al. |
| 5,547,501 A | 8/1996 | Maruyama et al. |
| 5,559,578 A | 9/1996 | Umeda et al. |
| 5,562,352 A | 10/1996 | Whritenor et al. |
| 5,565,906 A | 10/1996 | Schoon |
| 5,574,519 A | 11/1996 | Manico et al. |
| 5,575,898 A | 11/1996 | Wolf et al. |
| 5,584,070 A | 12/1996 | Harris et al. |
| 5,598,201 A | 1/1997 | Stodder et al. |
| 5,600,350 A | 2/1997 | Cobbs et al. |
| 5,600,352 A | 2/1997 | Knierim et al. |
| 5,606,347 A | 2/1997 | Simpson |
| 5,610,635 A | 3/1997 | Murray et al. |
| 5,615,287 A * | 3/1997 | Fu et al. ..................... 382/232 |
| 5,620,265 A | 4/1997 | Kondo |
| 5,625,391 A | 4/1997 | Hirabayashi et al. |
| 5,644,557 A | 7/1997 | Akamine et al. |
| 5,647,679 A | 7/1997 | Green et al. |
| 5,661,515 A | 8/1997 | Hevenor et al. |
| 5,694,334 A * | 12/1997 | Donahue et al. ............. 709/247 |
| 5,700,623 A | 12/1997 | Anderson et al. |
| 5,713,288 A | 2/1998 | Frazzitta |
| 5,721,992 A | 2/1998 | Chovanes |
| 5,745,049 A * | 4/1998 | Akiyama et al. ...... 340/870.17 |
| 5,755,519 A | 5/1998 | Klinefelter |
| 5,757,021 A | 5/1998 | Dewaele |
| 5,757,394 A | 5/1998 | Gibson et al. |
| 5,768,633 A | 6/1998 | Allen et al. |
| 5,774,639 A | 6/1998 | Schildkraut et al. |
| 5,774,752 A | 6/1998 | Patton et al. |
| 5,812,156 A | 9/1998 | Bullock et al. |
| 5,822,537 A * | 10/1998 | Katseff et al. ............. 709/231 |
| 5,842,118 A | 11/1998 | Wood, Jr. |
| 5,913,088 A | 6/1999 | Moghadam et al. |
| 5,914,671 A | 6/1999 | Tuttle |
| 6,075,950 A | 6/2000 | Stephenson |
| 6,078,958 A * | 6/2000 | Echeita et al. ............. 709/226 |
| 6,094,675 A * | 7/2000 | Sunaga et al. ............. 709/204 |
| 6,096,491 A | 8/2000 | Majumdar et al. |
| 6,099,178 A | 8/2000 | Spurr et al. |
| 6,106,166 A | 8/2000 | Spurr et al. |
| 6,124,083 A | 9/2000 | Majumdar et al. |
| 6,173,119 B1 | 1/2001 | Manico et al. |
| 6,211,869 B1 * | 4/2001 | Loveman et al. ........... 345/328 |
| 6,227,643 B1 | 5/2001 | Purcell et al. |
| 6,256,061 B1 * | 7/2001 | Martin et al. ............... 348/222 |
| 6,263,310 B1 | 7/2001 | Loudermilk et al. |
| 6,282,819 B1 | 9/2001 | Gu |
| 6,311,214 B1 * | 10/2001 | Rhoads ..................... 709/217 |
| 6,329,973 B1 * | 12/2001 | Akimoto et al. ............. 345/98 |
| 6,522,906 B1 * | 2/2003 | Salisbury, Jr. et al. ...... 600/407 |

OTHER PUBLICATIONS

Temic Semiconductors TK5550, Read/Write Transponder, Transponder, Telefunken Semiconductors, Rev. A1, Apr. 30, 1997.

Temic Semiconductors e5550, Standard Read/Write Identification IC, Telefunken Semiconductors, Rev. A3, Mar. 17, 1998.

Multi–Technology Card Guide, HID Corporation, An Assa Abloy Group Company.

ProxCard®II, Proximity Acces Card, HID Corp. An Assa Abloy Group Company, ©2001.

Atmel Smart Card ICs, Atmel Corp., San Jose, CA.

Tag–it—Moving Concepts to Reality, Published by Texas Instruments, Dallas, Texas, 2000.

Making RFID work for you: An Industry Roundtable hosted by Texas Instruments at NACS–Tech 1998, Published by Texas Instruments, Dallas, Texas, 2000 www.ti.com/tiris/docs/manuals/whtPapers/white.pdf.

The Cutting Edge of RFID Technology and Applications for Manufacturing and Distribution, by d'Hont, Published by Texas Instruments, Dallas, Texas, 2000 www.ti.com/tiris/docs/manuals/whtPapers/manuf–dist.pdf.

Latest Generation Technology for Immobilizer Systems, by Knebelkamp et al. Published by Texas Instruments, Dallas, Texas www.ti.com/tiris/docs/manuals/whtPapers/immobilizer.pdf.

* cited by examiner

DATA STORAGE AND RETRIEVAL PLAYBACK APPARATUS FOR A STILL IMAGE RECEIVER

FIELD OF THE INVENTION

The present invention relates generally to apparatus for data storage and retrieval in association with fixed still images such as photographs, X-rays and the like, and more particularly, to such apparatus particularly adapted for audio data storage and playback, which utilizes a wireless transponder including a memory for storing address information for a location on a communications network such as the World Wide Web where the data associated with a fixed still image is located, to enable easy access and playback of the audio data when viewing the still image.

BACKGROUND OF THE INVENTION

Audio or sound data has long been captured, recorded and/or dubbed onto mediums associated with moving pictures for later playback using optical, magnetic and chemical means. It is also well known to provide means associated with a still photography camera for recording audio data, then printing an optical code, such as a bar, dot or other optical code including the audio data on or adjacent to a fixed reproduction of an image captured by the camera for later replay using a suitable optical code reading device, such as a bar code reader. Reference in this regard, Akamine et al., U.S. Pat. No. 5,644,557 issued Jul. 1, 1997 to Olympus Optical Co., Ltd., of Tokyo, Japan. Reference also Kinoshita, U.S. Pat. No. 4,983,996 issued Jan. 8, 1991 to Casio Computer Co., Ltd., of Tokyo, Japan, and Kimball, U.S. Pat. No. 5,059,126 issued Oct. 22, 1991.

However, shortcomings of the above referenced disclosures include limited data capacity of the codes, and limited ability to alter the audio data represented by the codes and/or easily overwrite the codes. An additional shortcoming of the latter referenced disclosure is the requirement of a CD (Compact Disc) and compact disc player for retrieval of the stored audio data.

Reference further Inoue et al., U.S. Pat. No. 5,313,235 issued May 17, 1994 to Minolta Camera Kabushiki Kaisha, of Osaka, Japan which discloses a sound playback apparatus capable of playing back sounds relevant to photographs stored in an optical or magnetically readable format in association with the photographs. However, this device suffers from the shortcoming of a limited data storage capability, and the requirement of individually inserting and properly positioning the photographs into the playback apparatus for retrieval and playback of the recorded audio data.

In the field of contactless communications, RFID (Radio Frequency Identification) tags having a memory and transponder for storing and retrieving information relating to an associated item such as a parcel, passport, credit card, document, or the like, by a transceiver, are well known. Reference in this regard, Moskowitz et al. U.S. Pat. No. 5,528,222 and Want et al., U.S. Pat. No. 6,008,727 issued Dec. 28, 1999 to Xerox Corporation of Stamford, Conn. Reference also known tags available from Telefunken Semiconductors of Germany, and Texas Instruments of Dallas, Tex. as the TAG-IT™ INLAY. However, the data storage capacity and data communication rate of the known transponders is limited, making such devices generally disadvantageous for the storing and accessing of useful or meaningful amounts of audio data.

Therefore, there is a need to provide apparatus for storage and retrieval of audio, sound and other data in association with a fixed still image which eliminates the above referenced limitations and shortcomings associated with the known devices.

SUMMARY OF THE INVENTION

An object of the present invention is to provide apparatus for storage and retrieval of audio, sound or other data in association with a fixed still image which provides adequate storage capacity for a relatively large amount of the data, which optionally allows overwriting previously stored audio or sound data and addresses for the data, and which overcomes other of the shortcomings associated with the known audio data recording and playback devices.

With this object in view, the present invention resides in apparatus for retrieving stored data relating to a still image, including an image receiver including a medium for fixing a reproduction of the still image thereon, and a transponder connected to the image receiver including an antenna for receiving and sending signals, a memory for storing address information for accessing a site on a communications network containing the data relating to the still image, a processor and circuitry connected to the memory and the antenna for retrieving the address information from the memory and outputting an output signal including the address information over the antenna when a read signal is received.

According to an exemplary embodiment of the present invention, the apparatus additionally includes a transceiver including an antenna for outputting the read signal to the transponder and receiving the output signal from the transponder. According to another exemplary embodiment of the invention, the transceiver includes a device for audio playback of audio data. Additionally, the transponder preferably includes circuitry for receiving power from signals received over the antenna thereof, the transceiver being operable for outputting the signals over its antenna to the transponder antenna.

According to a still further exemplary embodiment of the present invention, the transceiver is connectable to a computing device including a processor and circuitry operable for retrieving the address information from the transceiver and executing a program for accessing the data relating to the still image over the communication network and outputting all or a selected portion of the data in a predetermined format.

A feature of the present invention is the provision of an image receiver including a simple, easy to use system for storing and retrieving data in association with a still image fixed thereon.

Another feature of the present invention is the provision of a apparatus that allows a relatively large amount of recorded audio data associated with a fixed still image to be easily retrieved and played back when viewing the image.

Another feature of the present invention is the provision of apparatus for the wireless recording and playback of audio data associated with a fixed still image, wherein the audio data can be stored in and retrieved from a data storage device located remotely from a receiver on which the still image is printed or otherwise fixed.

Another feature of the present invention is the provision of apparatus for the wireless recording and playback of audio data which includes an element adapted to be located on an image receiver on which a still image is to be fixed, for the receipt, storage and transmittal of address information for audio data over an antenna, the element being powerable by a signal received over the antenna.

Still another feature of the present invention is the provision of apparatus including an element for the recording and playback of audio data associated with a still image receiver which allows writing over previously stored audio data and address data for the audio data.

An advantage of the present invention is the capability to store a relatively large amount of audio data associated with a still image and simply and easily retrieve the data when the image is viewed.

Another advantage of the present invention is the capability to store and access a relatively large amount of audio data associated with a still image and easily retrieve the data without requiring a large data storage device or a power source associated with the image itself.

Another advantage of the present invention is the capability to store audio data associated with a still image on a communications network remotely from a receiver on which the still image is printed or otherwise fixed, then simply and easily retrieve the stored data for play back when the image is viewed from any location where access to the communications network is provided.

These and other objects, features and advantages of the present invention will become apparent to those skilled in the art upon reading of the following detailed description when taken in conjunction with the drawings wherein there are shown and described illustrative embodiments of the invention.

BRIEF DESCRIPTION OF THE DRAWINGS

While the specification concludes with claims particularly pointing out and distinctly claiming the subject matter of the present invention, it is believed the invention will be better understood from the following detailed description when taken in conjunction with the accompanying drawings.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
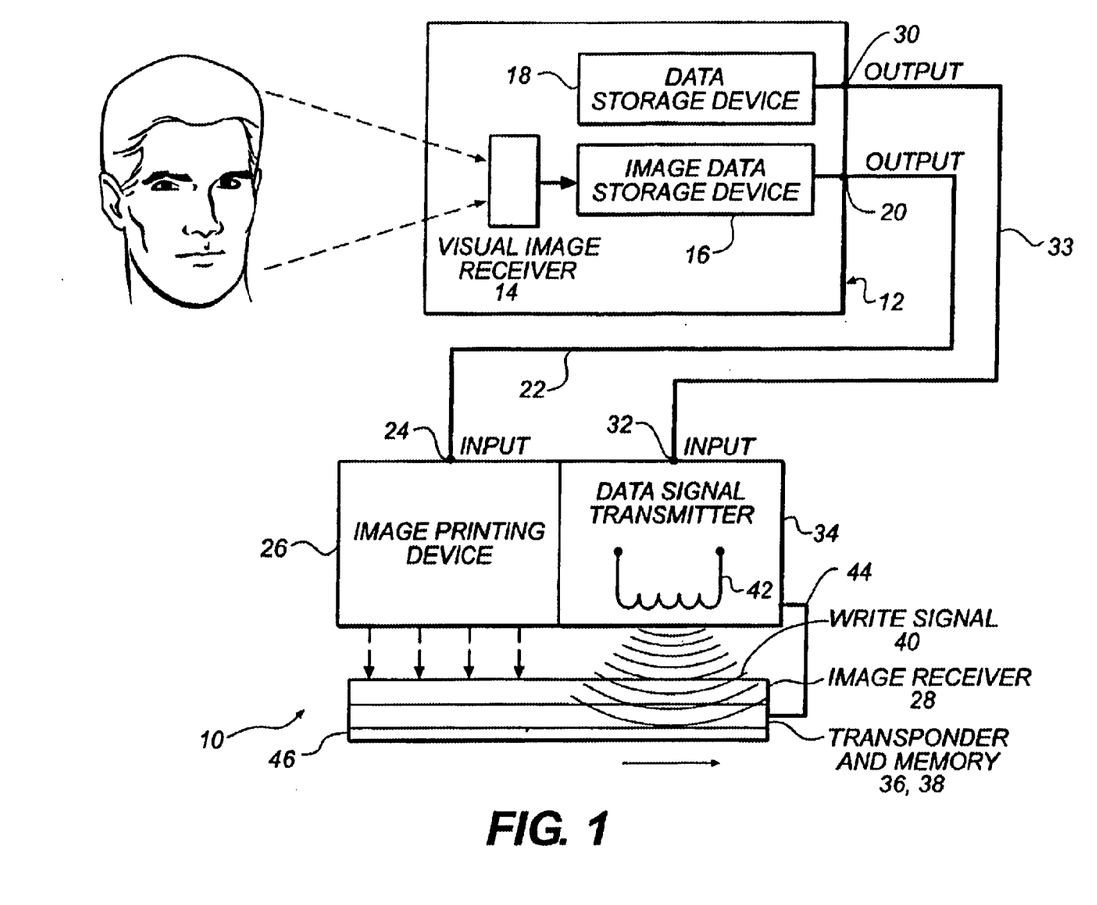
FIG. 1 is a simplified combination schematic and block diagrammatic representation showing elements of apparatus according to the present invention including a still image receiver including a transponder and memory, in association with elements for receiving and fixing a still image on the receiver and for transmitting address data to the transponder.

Therefore, referring to FIG. 1, there is shown apparatus 10 for data storage and retrieval in association with a fixed still image, constructed and operable according to the teachings of the present invention. Apparatus 10 is shown with other apparatus including a device 12 which can be, for example, a digital or analog camera, including a visual image receiver 14 for capturing or receiving still visual image data and a corresponding image data storage device such as a conventional photographic film or memory. Device 12 also includes a data storage device 18 for storing address data for information associated with a captured or stored image, which address data can be inputted at the time that an associated image is captured or before or after, as desired. Here, it is contemplated that such address data will be suitably encoded, for instance, in a HyperText Mark-up language (HTML), and will include identifying information for an address on a communications network such as the World Wide Web (WWW), for instance, a domain name (DN) and a path name (PN) for a web site on the WWW. Such information can additionally or alternatively include a file name (FN) for a file at the site, and can be supplemented with information stored elsewhere, such that complete address data can be compiled to enable automatically accessing data associated with a particular image at a desired web site using a suitable conventional protocol, for instance a Hyper-Text Transmission Protocol (HTTP) and a web browser program such as Navigator.RTM™ available from Netscape, or Internet Explorer™ available from Microsoft.

Image data storage device 18 is shown including an output 20 connected as shown by line 22 to an input 24 of an image printing device 26 conventionally constructed and operable for printing or fixing a representation of the received or captured visual still image on an image receiver 28 of apparatus 10 which receiver 28 can be a conventional physical medium such as a sheet of photographic paper, a transparent film, or the like. Data storage device 18 includes an output 30 connected as shown by line 33 to an input 32 of a data signal transmitter 34 conventionally constructed and operable for sending the address data stored in device 18 to a transponder 36 including a memory 38 for storage in memory 38. Transponder 36 can be any of a wide variety of conventionally constructed and operable transponder devices such as those commonly used as RFID tags having a memory and transponder for storing and retrieving information relating to an associated item, for instance, such as disclosed in Moskowitz et al. U.S. Pat. No. 5,528,222 and Want et al., U.S. Pat. No. 6,008,727 incorporated herein by reference, and those available from Telefunken Semiconductors of Germany, and from Texas Instruments of Dallas, Tex. as the TAG-IT™ INLAY. Data signal transmitter 34 can be operated to send the address data to transponder 36 via a write signal 40 outputted over an antenna 42 to be received by an antenna 48 on transponder 36 (FIG. 2), or over a hard wired connection as shown at 44, as desired. Transponder 36 is additionally shown including a layer of a shielding material, here, a metallic foil 42 on a bottom surface thereof for containing or limiting passage of electromagnetic radiation (EMR) therethrough, for containing or reflecting radio frequency (RF) transmission signals which could interfere with the proper operation of transponder 36 or another transponder located nearby.

Figure 2:
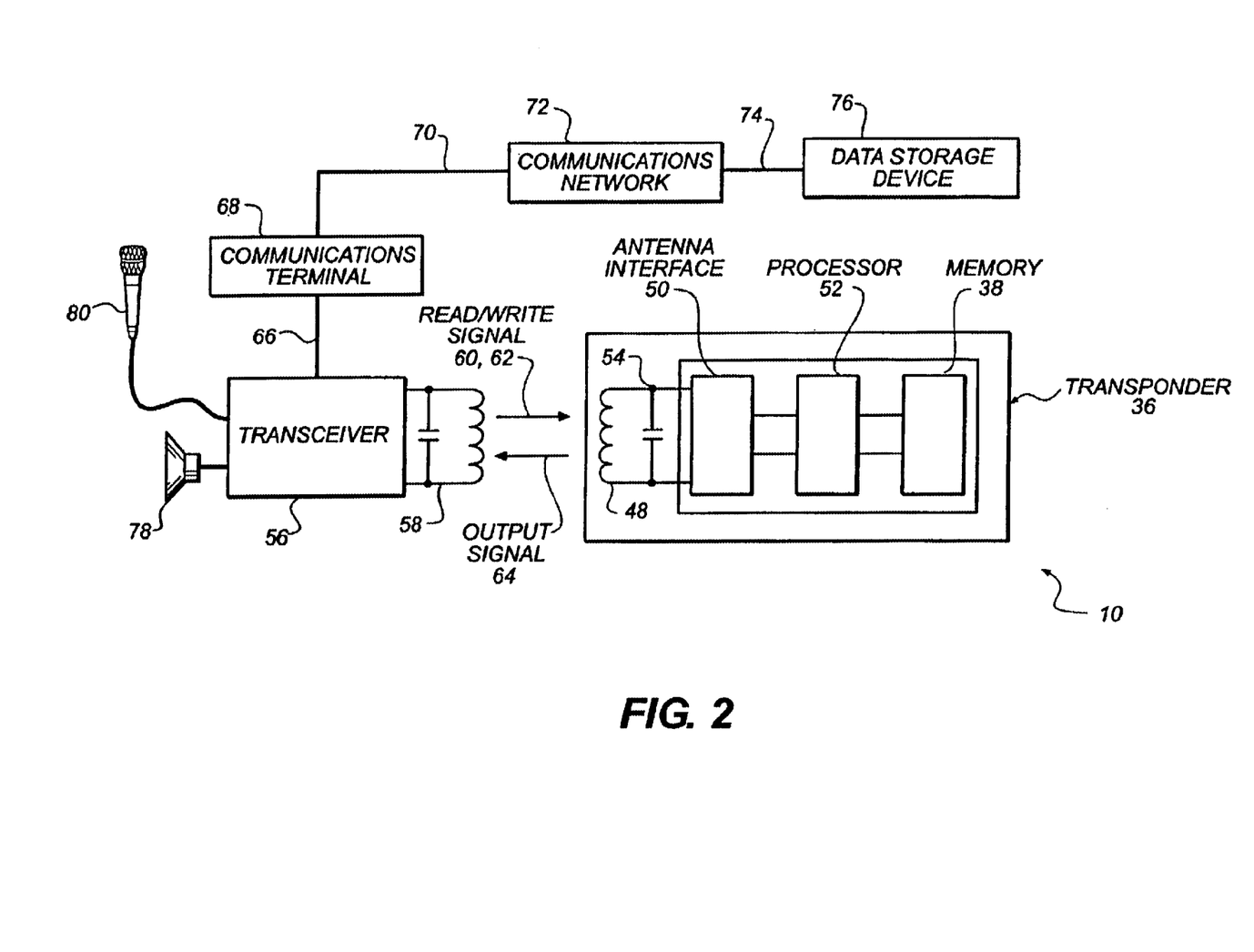
FIG. 2 is a simplified block diagram showing circuitry of the transponder of FIG. 1 in association with a transceiver, a communications terminal, a communications network and a data storage device of the present invention.

Referring to FIG. 2, transponder 36 of apparatus 10 generally includes an RF coil antenna 48 connected to a coil interface 50, which in turn, is connected to a processor 52 and memory 38. Memory 38 preferably includes one or more memory chips having a sufficiently large data storage capacity for holding the desired address information, such as one or more conventional commercially available 264 bit EEPROMs. Antenna 48 is connected in parallel with a capacitor for tuning to a selected frequency and for providing an LC circuit for powering transducer 36 when a radio frequency signal is received. Antenna 48 serves as a bi-directional communications interface for processor 52 and a transceiver 56 which has an RF coil antenna 58 tuned to the same frequency as antenna 48. Transceiver 56 is preferably a conventional commercially available RF transmitter/receiver operable for generating and outputting a read signal 60 and optionally a write signal 62 over antenna 58. Transponder 36 is operable to receive the read signal 60 and responsively retrieve the stored address data from memory 38 and output it in an output signal 64 over antenna 48 to transceiver 56. Transponder 36 is similarly operable to receive the optional write signal which can include data such as, but not limited to, new address data such as a new DN, PN or FN, or a new portion of any of these. When the write signal is received, transponder 36 is operable to store the address data in memory 38 for later retrieval when read signal 60 is received.

Transceiver 56 is operable for receiving output signal 64 containing the address data and is connected in a suitable conventional manner, as represented by line 66, to a communications terminal 68 which in turn is connected or connectable, as represented by line 70, to a communications network 72. Communications network 72, in turn, is connected to as shown at line 74, or includes, a data storage device 76 containing data associated with the image on image receiver 28 (FIG. 1). Communications network 72, for instance, can include, but is not limited to, the WWW, and communications terminal 68 can include, but is not limited to, a conventional commercially available personal computer device including a processor, a memory, a telephone modem, and a suitable program for automatically accessing data storage device 76 over the WWW using the DN, PN and FN (when required), for instance, a conventional commercially available web browser program such as Navigator.RTM™ available from Netscape, or Internet Explorer™ available from Microsoft. As additional alternatives, it is contemplated that communications terminal 68 can include any of a number of commercially available internet communications terminals operable in the well known physical, i.e., hard wired or fiber optic, or wireless mediums, such as, but not limited to, the Mediamaster 9500™ internet terminal available from Nokia; the NetStation™ terminal from Acorn Computer; or the Internet Digital Appliance, from Diba. It is contemplated that the data storage device 76 containing the data associated with the image on image receiver 28 (FIG. 1) can include a conventional information server and that the data will be suitably encoded, for instance, in a HTML format or the like. It is also contemplated that communications network 72 can include a telephone, cable, satellite and/or other network and communications terminal 68 can include a corresponding conventional data port or terminal connected or connectable to data storage device 76 over the telephone, cable, satellite and/or other network for retrieving the data stored therein using suitable protocols, without departing from the present invention.

The data received from data storage device 76 by communications terminal 68 can then be converted or decoded using suitable conventional means to a desired format and outputted. For instance, if the data is audio data, the data can be decoded and converted to an analog audio signal, amplified as desired, using suitable conventional apparatus, and outputted over an audio speaker, such as speaker 78 connected to transceiver 56 or communications terminal 68. As an optional additional feature, transceiver 56 or communications terminal 68 can additionally include apparatus to allow inputting audio data to data storage device 76, including an input device, such as a microphone 80.

Figure 3:
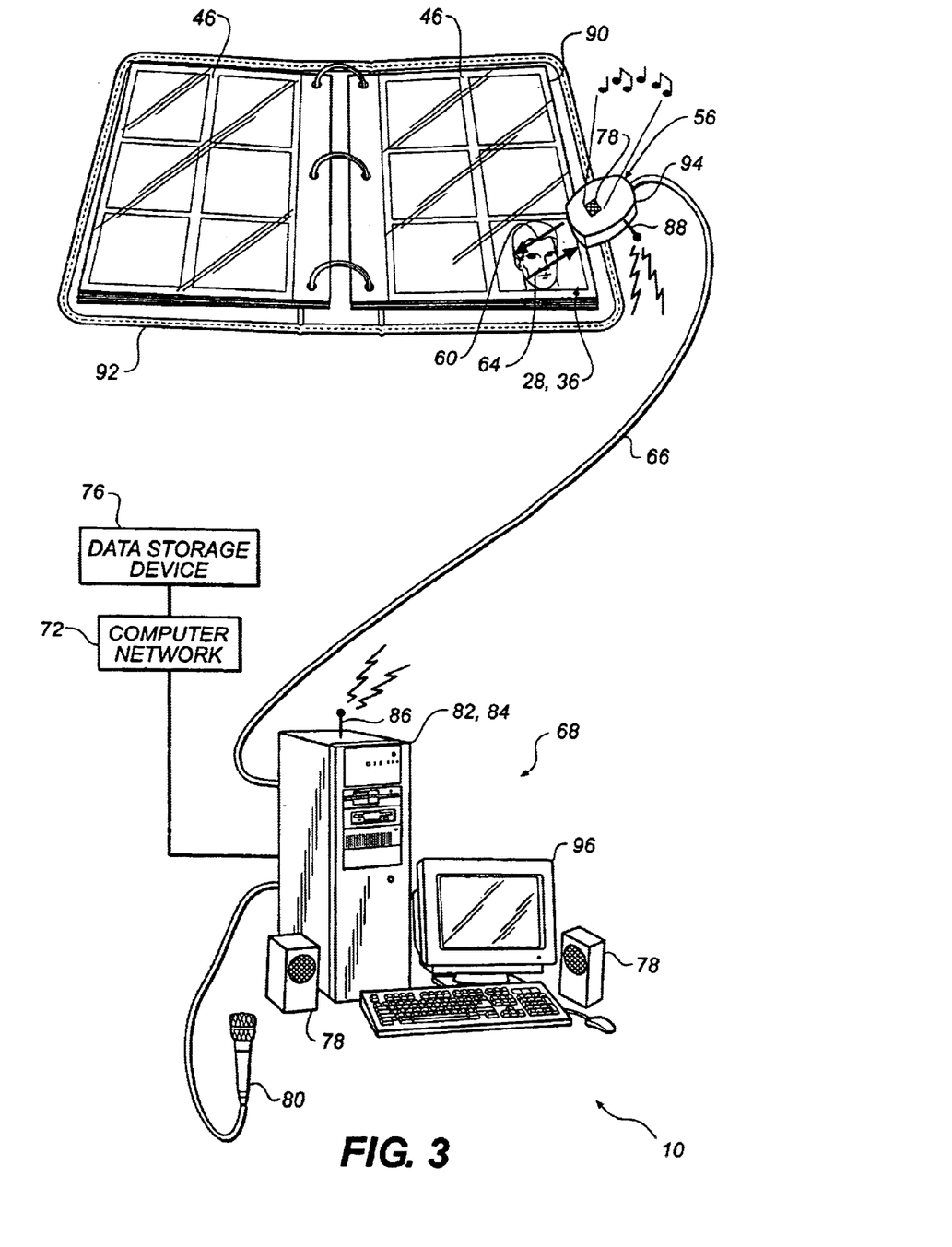
FIG. 3 is a simplified combination schematic and block diagram showing elements of the present invention for reading address data from a transponder of a still image receiver and outputting data associated with the still image from a data storage device of a computer network.

Referring to FIG. 3, apparatus 10, including an image receiver 28 with a transponder 36; a transceiver 56; and a communications terminal 68, is shown connected to a communications network 72, which in turn is connected to a data storage device 76. Here, communications terminal 68 is a conventional personal computer including a multimedia capable processor 82 and a memory 84 including a web browser program for accessing the data in storage device 76 over network 72 and a multimedia program to allow outputting audio data received, the computer being connected to audio speakers 78 for that purpose. The computer is additionally connected to an optional microphone 80 for audio input. Transceiver 56 can communicate with the computer over a hardwired line 66, or via RF signals over antennas 86 and 88, as shown.

Image receiver 28 is shown mounted on a page 90 of a conventional photo album 92 adapted for receiving and holding image receivers individually or in an array on one side of the page, as shown. Another individual or array of image receivers will typically be located on the opposite side of the page, and on other pages of the album. To reduce the occurrence of undesired RF communication or interference between antenna 58 of transceiver 56 and other transponders on the opposite side of a page 90 (not shown), pages 90 can each include a layer of an EMR shielding material such as metallic foil 46 located between the transponder 28 and the transponders on the opposite sides of the page. To reduce the occurrence of undesired RF communications or interference between antenna 58 of transceiver 56 and other transponders on the same page as transponder 28, or on an adjacent opposing page, antenna 58 can be partially shielded using metallic foil 46, and/or a metallic case 94, as shown.

In operation, to retrieve the stored data associated with a selected image receiver 28, transceiver 56 is brought into proximity to transponder 36 of the image receiver 28 such as shown and is actuated to emit the read signal 60. This, in turn, automatically actuates transponder 36 to output the output signal 64 including the address information for the stored data. Output signal 64 is received by transceiver 56, which communicates the address information to communications terminal 68 which then automatically retrieves the stored data from data storage device 76 over communications network 72 and outputs the data as desired. In the instance of textual or graphical data, the data can be outputted using a conventional video monitor 96, printer (not shown), or the like. For playback of retrieved audio data, the audio data can be outputted over audio speakers 78 of communications terminal 68, or a remote speaker 78, for instance located on transceiver 56 as shown.

It may be appreciated from the description hereinabove, that according to the present invention, a wide variety and a large amount of data associated with a visual image, including, but not limited to, audio data, textual data, and/or visual data, can be stored at a location remote from a fixed representation of the image, then easily retrieved and used or played back when the image is viewed. It may also be appreciated that the stored data can be increased, decreased, or overwritten, as desired. Still further, it may be appreciated that different, or multiple communications networks can be used for accessing the stored data, and that the address data stored with the still image can be supplemented or overwritten, as required.

While the invention has been described with particular reference to its preferred embodiment, it will be understood by those skilled in the art that various changes can be made and equivalents may be substituted for elements of the preferred embodiment without departing from the invention.

In addition, many modifications may be made to adapt a particular situation and material to a teaching of the present invention without departing from the essential teachings of the invention.

Therefore, what is provided is apparatus for storage and retrieval of audio, sound or other data in association with a fixed still image which provides adequate storage capacity for a relatively large amount of the data, which optionally allows overwriting previously stored audio or sound data and addresses for the data, and which overcomes other of the shortcomings associated with the known audio data recording and playback devices.

Parts List 10 apparatus
12 device
14 visual image receiver
16 image data storage device
18 data storage device
20 output
22 line
24 input
26 image printing device
28 image receiver
30 output
32 input
33 line
34 data signal transmitter
36 transponder
38 memory
40 write signal
42 antenna
44 hard wire
46 metallic foil
48 antenna
50 coil interface
52 processor
54 capacitor
56 transceiver
58 antenna
60 read signal
62 write signal
64 output signal
66 line
68 communications terminal
70 line
72 communications network
74 line
76 data storage device
78 speaker
80 microphone
82 processor
84 memory
86 antenna
88 antenna
90 page
92 photo album
94 metallic case
96 video monitor

What is claimed is:

1. A system comprising:
an image receiver medium supporting fixed visible indicia and a transponder attached to the image receiver medium and the transponder including:
   (a) an antenna for receiving and sending signals, the receiving signals including a read signal,
   (b) a memory for storing address information for accessing a site on a communications network external to the image receiver medium the communications network containing data relating to the still image,
   (c) a processor and circuitry connected to the memory and the antenna for retrieving the address information from the memory and outputting an output signal including the address information over the antenna when a read signal is received; and
   (d) a transceiver including an antenna for outputting the read signal to the transponder and receiving the output signal from the transponder;
wherein the transceiver is connected to a computing device including a processor and circuitry operable for retrieving the address information from the transceiver and executing a program for accessing the data relating to the still image over the communication network and outputting all or a selected portion of the data in a predetermined format.

2. The system of claim 1, wherein the data relating to the still image comprises audio data, and the system further comprises a device for audio playback of the audio data.

3. The system of claim 1, wherein the data comprises audio data and the predetermined format comprises an audio format.

4. The system of claim 1, wherein the transponder is operable for receiving a write signal containing the address information and storing the address information in the memory, and the transceiver is operable for outputting the write signal to the transponder.

5. The system of claim 4, wherein the read and write signals are operable to activate the processor and the circuitry of the transponder to receive the read and write signals and output the output signal.

6. The system of claim 1, wherein the transponder is powered by the signals received.

7. The system of claim 1, wherein the communications network comprises the world wide web, the site on the communications network containing the data relating to the still image comprises an information server connected to the world wide web, and the address information comprises at least a domain name for the information server.

8. The system of claim 7, wherein the address information further comprises a file name for a file of the server containing the data.

9. The system of claim 8, wherein the data comprises audio data.

10. The system of claim 1, wherein the antenna of the transponder is EMR shielded to limit transmission and reception of signals therefrom and thereto.

11. The system of claim 1, wherein the antenna of the transceiver is EMR shielded to limit transmission and reception of signals therefrom and thereto.

12. The system of claim 4, wherein the transponder is operable for receiving a write signal containing the address information from a transceiver and storing the address information in the memory.

13. The system of claim 12, wherein the communications network comprises the World Wide Web, the site on the communications network containing the data relating to the still image comprises an information server connected to the World Wide Web, and the address information stored in the memory of the transponder comprises at least a domain name for the information server.

14. The system of claim 1, wherein the communications network comprises the World Wide Web, the site on the communications network containing the data relating to the still image comprises an information server connected to the World Wide Web, and the address information stored in the memory of the transponder comprises at least a domain name for the information server.

15. The system of claim 14 wherein the data relating to the still image comprises audio data.

16. The system of claim 15 wherein the transponder is powered by signals received by the antenna of the transponder.

17. The system of claim 1 wherein the address information stored in the memory of the transponder comprises at least a domain name for access to the World Wide Web and the transponder is powered by signals received by the antenna of the transponder.

18. A method for retrieving stored data relating to a still image comprising:
   providing an image receiver medium having fixed visible indicia and a transponder attached to the image receiver medium and the transponder including:
      (a) an antenna for receiving and sending signals, the receiving signals including a read signal,
      (b) a memory for storing address information for accessing a site on a communications network external to the image receiver medium the communications network containing data relating to the still image,
      (c) a processor and circuitry connected to the memory and the antenna for retrieving the address information from the memory and outputting an output signal including the address information over the antenna when a read signal is received; and
   providing a transceiver including an antenna and outputting the read signal from the transceiver to the transponder and receiving the output signal from the transponder;
   wherein the transceiver includes an antenna that outputs the read signal to the transponder and receives the output signal from the transponder and further wherein the antenna of the transponder receives a radio frequency signal that powers the transducer and wherein the transceiver is connected to a computing device including a processor and circuitry that retrieves the address information from the transceiver and executes a program which accesses the data relating to the still image over the communication network and outputs all or a selected portion of the data in a predetermined format.

19. The method of claim 18, wherein the data relating to the still image comprises audio data, and operating an audio playback device in response to the audio data.

20. The method of claim 18 wherein the address data is an address on the World Wide Web.

21. The method of claim 20 wherein the transponder is operable for receiving a write signal containing the address information and storing the address information in the memory, and the transceiver is operable for outputting the write signal to the transponder.

22. The method of claim 18 wherein the transponder is powered by the signals received by the antenna of the transponder.

23. The method of claim 22 wherein the communications network comprises the World Wide Web, the site on the communications network containing the data relating to the still image comprises an information server connected to the World Wide Web, and the address information comprises at least a domain name for the information server.

24. The method of claim 23, and wherein the address information further comprises a file name for a file of the server containing the data.

25. The method of claim 24, wherein the data comprises audio data.

26. The method of claim 25, wherein the antenna of the transponder is EMR shielded to limit transmission and reception of signals therefrom and thereto.

27. The method of claim 18, wherein the antenna of the transceiver is EMR shielded to limit transmission and reception of signals therefrom and thereto.

* * * * *